United States Patent
Stampfli et al.

(10) Patent No.: US 9,999,948 B2
(45) Date of Patent: Jun. 19, 2018

(54) METHOD FOR RECONDITIONING A TURBINE BLADE

(75) Inventors: Matthias Stampfli, Dottigen (CH); Michael Seemann, Laufenburg (DE); Reto Maitz, Unterkulm (CH); Raphael Schweizer, Lengnau (CH); Ahmad Zaki Bin Ahmad Zainuddin, Windisch (CH); Warren Miglietti, Jupiter, FL (US)

(73) Assignee: ANSALDO ENERGIA IP UK LIMITED, London (GB)

( * ) Notice: Subject to any disclaimer, the term of this patent is extended or adjusted under 35 U.S.C. 154(b) by 710 days.

(21) Appl. No.: 12/779,336

(22) Filed: May 13, 2010

(65) Prior Publication Data

US 2010/0313419 A1 Dec. 16, 2010

(30) Foreign Application Priority Data

May 15, 2009 (CH) ..................................... 0076809

(51) Int. Cl.
*B23P 6/00* (2006.01)
*F01D 5/18* (2006.01)

(52) U.S. Cl.
CPC .............. *B23P 6/005* (2013.01); *F01D 5/189* (2013.01); *F05D 2230/80* (2013.01); *Y10T 29/49318* (2015.01)

(58) Field of Classification Search
CPC .......... F01D 5/188; F01D 5/189; B23P 6/005; F05D 2230/80
USPC ... 29/402.03, 402.08, 402.11, 402.13, 889.1, 29/889.21; 228/119, 245, 248.1, 248.5, 228/246; 415/115, 116, 96 A, 96 R, 415/97 R; 416/96 A, 96 R, 193 A, 248
See application file for complete search history.

(56) References Cited

U.S. PATENT DOCUMENTS

| | | | | |
|---|---|---|---|---|
| 3,388,888 A | * | 6/1968 | Kercher | F01D 5/189 415/115 |
| 4,924,581 A | * | 5/1990 | Jakobsen | 29/402.02 |
| 5,579,534 A | * | 11/1996 | Itoh et al. | 428/547 |
| 6,120,244 A | * | 9/2000 | Fukura | 415/115 |

(Continued)

FOREIGN PATENT DOCUMENTS

| | | |
|---|---|---|
| DE | 19963716 A1 | 7/2001 |
| EP | 0926313 A1 | 6/1999 |
| EP | 1471210 A1 | 10/2004 |

*Primary Examiner* — Livius R Cazan
(74) *Attorney, Agent, or Firm* — Buchanan Ingersoll & Rooney PC

(57) ABSTRACT

A method is provided for reconditioning a turbine blade. The turbine blade includes a blade airfoil which extends longitudinally and into the hollow inner space of which inserts can be inserted in the longitudinal direction of the blade for distribution and guiding cooling air which flows in the inner space. The inserts with a rib engage with sealing effect in a U-shaped sealing groove which is machined out on the inner wall of the blade airfoil and extend in the longitudinal direction of the blade. A damaged sealing groove is reconditioned by the sealing groove being removed from the inner wall of the blade airfoil, forming a slot, by an insertion strip, which is provided for sealing, being inserted into the slot, and by the insertion strip, which is seated in the slot, being connected in a materially bonding manner to the inner wall of the blade airfoil.

9 Claims, 6 Drawing Sheets

(56) References Cited

U.S. PATENT DOCUMENTS

| | | | | |
|---|---|---|---|---|
| 6,199,746 B1* | 3/2001 | Dupree | ............... | B23P 6/005 |
| | | | | 228/119 |
| 6,238,182 B1* | 5/2001 | Mayer | ............... | 416/96 A |
| 6,561,764 B1* | 5/2003 | Tiemann | ............... | 416/96 R |
| 2002/0018711 A1 | 2/2002 | Ferber | | |
| 2002/0153405 A1* | 10/2002 | Esch | ............... | 228/119 |

* cited by examiner

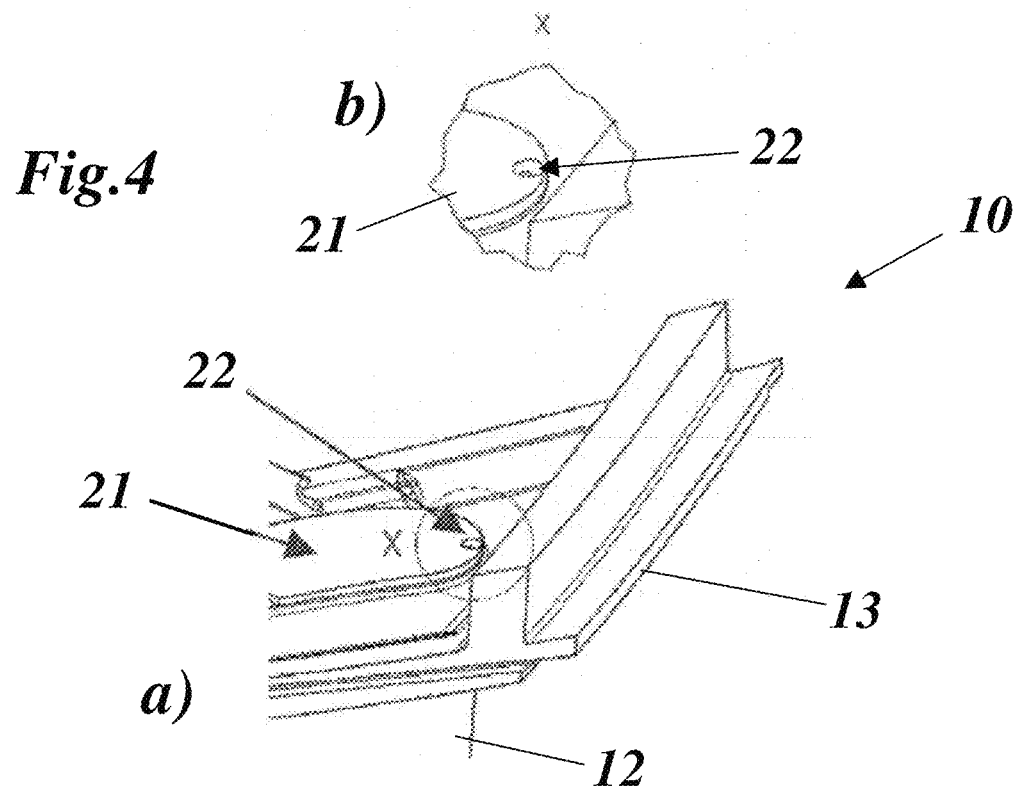
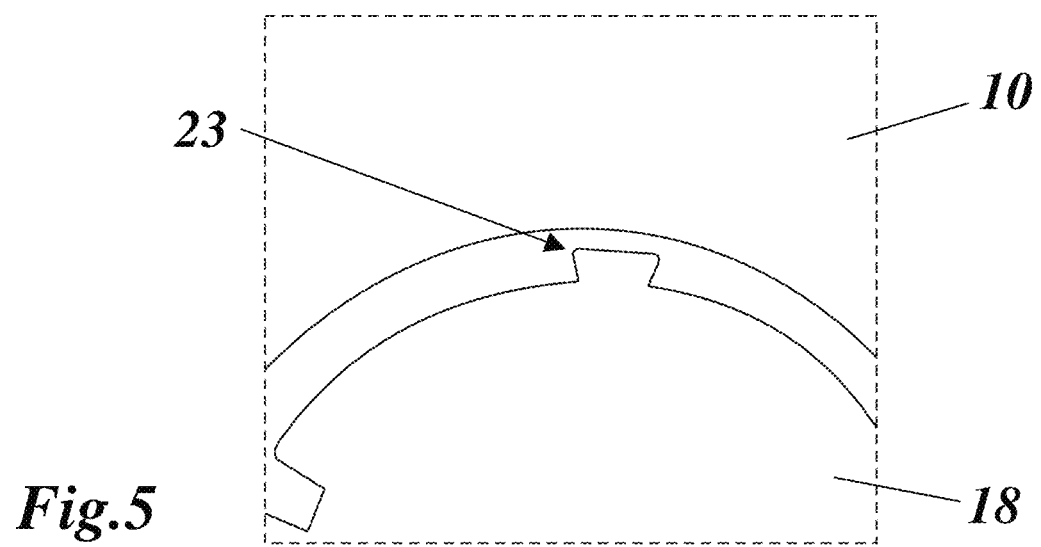

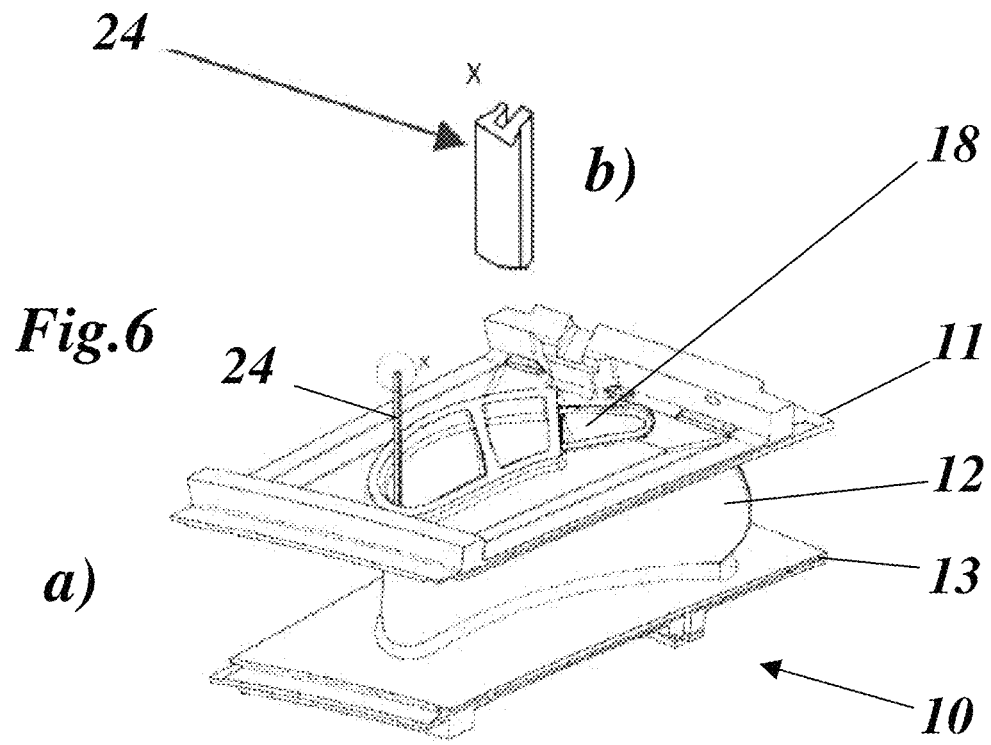
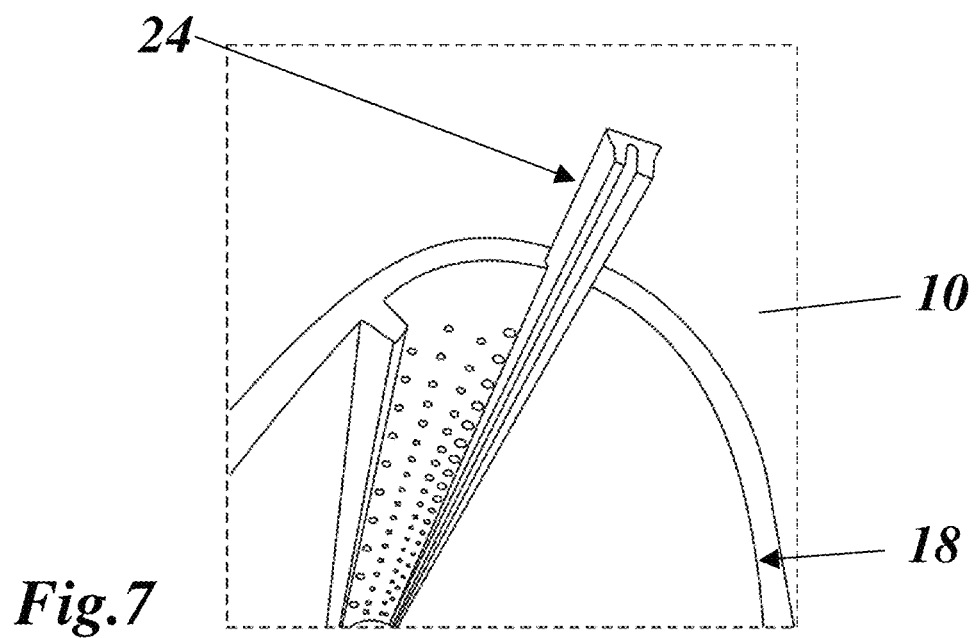

METHOD FOR RECONDITIONING A TURBINE BLADE

FIELD OF INVENTION

The present invention relates to the field of gas turbines. It refers to a method for reconditioning a turbine blade.

BACKGROUND

Gas turbines, as are used as stationary machines for example in combined cycle power plants, compress air which is inducted in a compressor section and direct the compressed air to a combustion chamber where it is used for combusting a fuel. The hot combustion gases are expanded in a subsequent turbine, performing work, and then discharged to the outside or directed through a heat recovery steam generator for producing steam. The blades in the turbine section, which are divided into rings of (stationary) stator blades and (rotating) rotor blades, which are arranged in series in an alternating manner, are exposed to high thermal and mechanical stresses as a result of the extremely hot gases which flow in the hot gas passage of the turbine. In order to achieve a turbine inlet temperature which is as high as possible, and therefore high efficiency, special materials and cooling techniques are used for the blades of the turbine.

The first row of stator blades directly after the outlet of the combustion chamber is particularly stressed because the temperatures of the hot combustion gases are highest there. In FIG. 1, an exemplary stator blade from the first row of a gas turbine which is in the market is shown in a perspective side view. The stator blade 10 comprises a blade airfoil 12 which extends in the longitudinal direction of the blade, or in the radial direction of the gas turbine, and at the ends merges into an inner platform 13 and an outer platform 11. The inner platforms 13 of all the stator blades 10 of a ring together form an annular inner wall which delimits the hot gas passage 17 on the inside. All the outer platforms 11 correspondingly form an annular outer wall which delimits the hot gas passage 17 on the outside. In preferred regions of the platforms 11, 13 and of the blade airfoil 12, holes or hole rows are arranged, through which cooling air flows into the hot gas passage 17 and forms a protective cooling air film there.

The stator blade 10, or its blade airfoil 12, however, is also cooled from the inside. For this, the blade airfoil 12 has a hollow inner space (18 in FIGS. 2 and 3) through which cooling air is directed and in a defined manner brought into contact with the inner sides of the blade airfoil walls. To accommodate this, a multiplicity of hollow inserts 14, 15 and 16 are provided with hole rows, the inserts can be inserted into the inner space 18 of the blade airfoil 12 in the longitudinal direction and from the cooling air, which is fed in its interior, form individual cooling air jets which are directed onto the inner sides of the blade walls for impingement cooling. In order to divide the inner space 18 into individual compartments, sealing grooves 19, into which the corresponding insert 14 with a matching rib 20 (FIG. 3) can be inserted, are formed on the inner side of the blade wall and extend in the longitudinal direction of the blade (FIG. 2).

The sealing groove 19, which is shown in FIG. 2, is located directly in the region of the leading edge of the blade and as a result is thermally particularly stressed. Therefore, after an extended operating time this groove frequently loses its original shape and integrity so that the intended sealing function in interaction with the rib 20 of the insert 14 is no longer ensured and cooling of the blade no longer functions in the customary manner. In order to still be able to reuse the blade, it would be desirable if the blade could be reconditioned with limited expenditure so that it regains its original functionality again to the full extent.

SUMMARY

The present disclosure is directed to a method for reconditioning a turbine blade. The turbine blade includes a blade airfoil which extends in the longitudinal direction of the blade and which has a hollow inner space into which inserts can be inserted in the longitudinal direction of the blade for the distribution and guiding of cooling air which flows in the inner space. The inserts, with a rib, engage with sealing effect in a U-shaped sealing groove which is machined out on the inner wall of the blade airfoil and extends in the longitudinal direction of the blade. The method includes removing the sealing groove from the inner wall of the blade airfoil, forming a slot. The method also includes inserting an insertion strip, which is provided for sealing, into the slot, and connecting the insertion strip, which is seated in the slot, in a materially bonding manner to the inner wall of the blade airfoil.

BRIEF DESCRIPTION OF THE DRAWINGS

The invention shall subsequently be explained in more detail based on exemplary embodiments in conjunction with the drawing. In the drawing

FIG. 4 shows in an overall view (FIG. 4a) and in an enlarged detailed view (FIG. 4b) the hole which has to be introduced into the cover of the blade airfoil inner space for carrying out the method according to the invention;

FIG. 5 is a graphic representation, which is comparable to FIG. 2, of the inner side of the blade, with the dovetail-shaped slot which is introduced into the wall of the blade airfoil;

FIG. 6 shows in an overall view (FIG. 6a) and in an enlarged detailed view (FIG. 6b) the insertion strip which is inserted into the dovetail-shaped slot as replacement for the removed sealing groove from FIG. 2;

FIG. 7 is a graphic representation, which is comparable to FIG. 2, of the inner side of the blade with the insertion strip partially inserted into the dovetail-shaped slot;

DETAILED DESCRIPTION OF THE PREFERRED EMBODIMENT

Introduction to the Embodiments

It is therefore the object of the invention to disclose a method for reconditioning a turbine blade, especially a stator blade of the first blade row of a gas turbine, with which defective regions inside the blade which are necessary for cooling can be removed with limited expenditure.

The object is achieved by the entirety of the features of claim 1. It is essential for the solution according to the invention that in a first step a defective sealing groove is removed from the inner wall of the blade airfoil, forming a slot, that in a second step an insertion strip, which is provided for sealing, is inserted into the slot, and that in a third step the insertion strip, which is seated in the slot, is connected in a materially bonding manner to the inner wall of the blade airfoil. By the method, a local repair is made possible which leaves the remaining regions of the blade largely untouched.

According to one development of the method according to the invention, removal of the sealing groove and introduction of the slot by an electrical discharge machining process are carried out.

In another development of the invention, the slot has a dovetail-shaped cross section and the insertion strip has a cross section which is adapted to this.

The insertion strip in this case can already be provided with a sealing groove, which extends in the longitudinal direction, before insertion into the slot.

It is also conceivable, however, for the insertion strip to be provided with a sealing groove, which extends in the longitudinal direction, after insertion into the slot and after the materially bonding connection to the inner wall of the blade airfoil.

In this case, the sealing groove is preferably produced by an electrical discharge machining process.

In a further development of the invention, the insertion strip, which is seated in the slot, is connected in a materially bonding manner to the inner wall of the blade airfoil by hard soldering.

For the hard soldering, a CoNiCrWC powder of type MM509 can especially be used, wherein the process includes a temperature treatment at about 1220° C.

DETAILED DESCRIPTION

Figure 1:
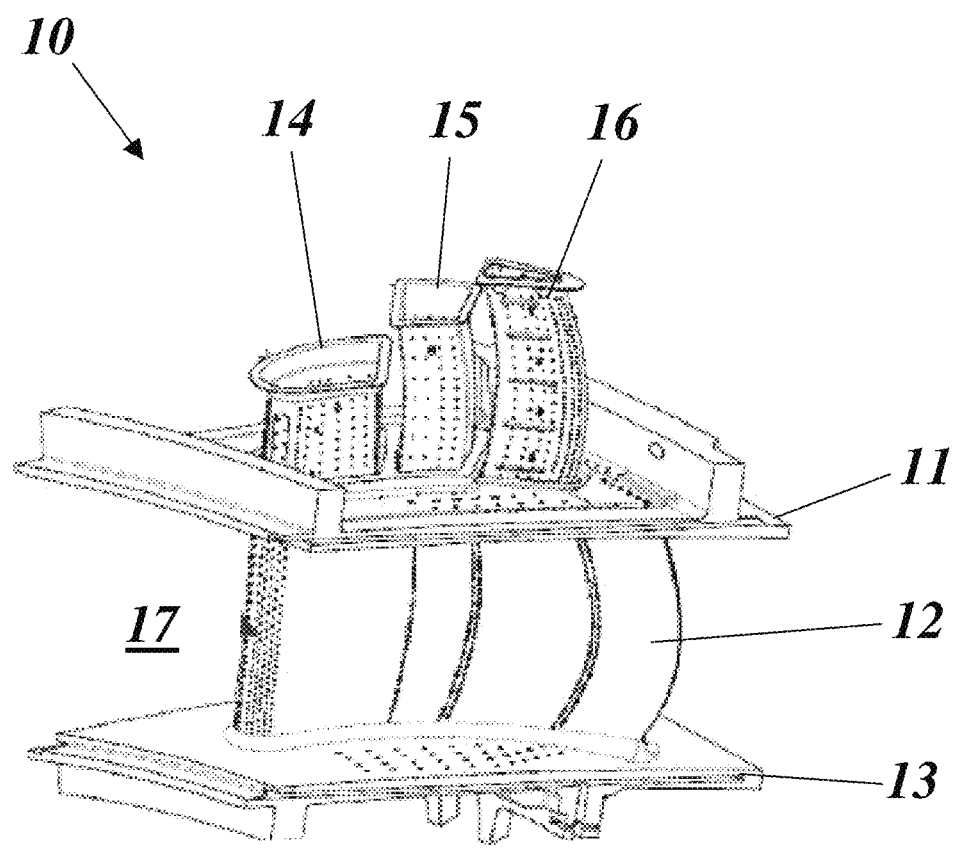
FIG. 1 shows in a perspective side view an exemplary stator blade from the first row of a gas turbine, wherein the inserts which are required for the internal cooling of the blade are partially withdrawn.
Figure 2:
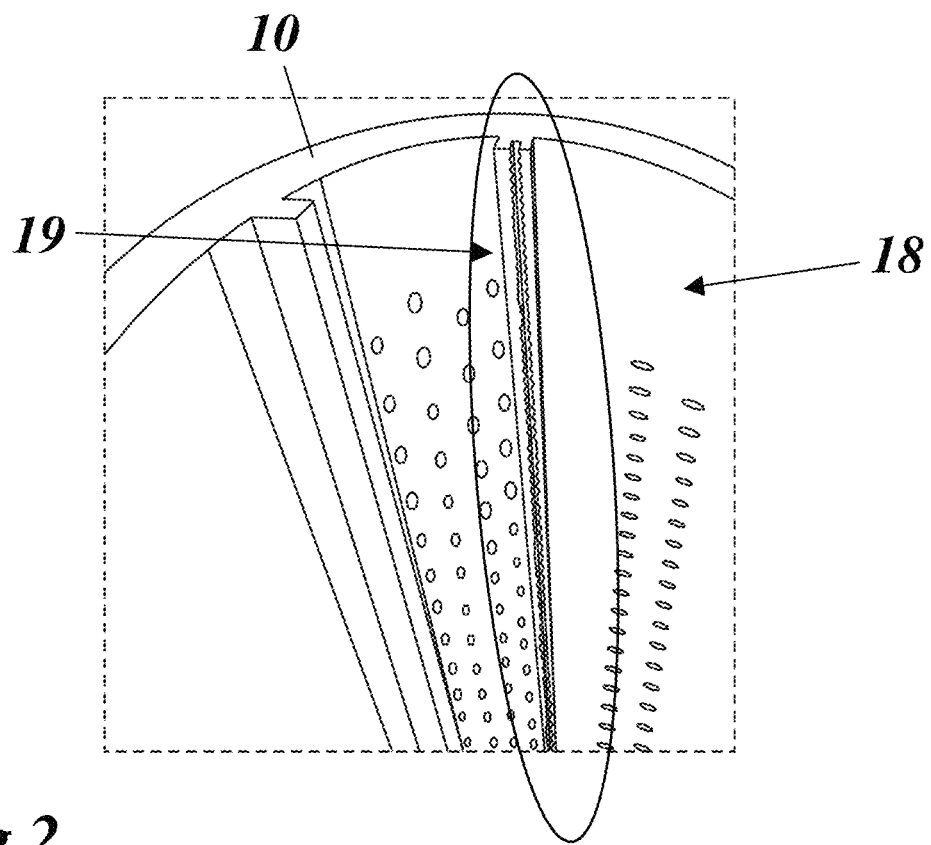
FIG. 2 is a graphic representation of the inner side of a blade according to FIG. 1 with a sealing groove, which is damaged as a result of operation, for the front insert from FIG. 1.
Figure 3:
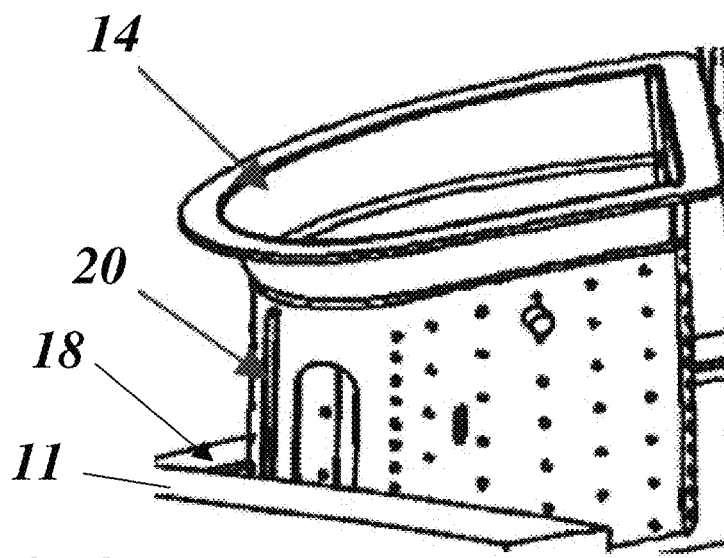
FIG. 3 shown in an enlarged detailed view the front insert from FIG. 1 with the rib which engages in the sealing groove.

Starting from the situation which is shown in FIG. 2, when carrying out the method of reconditioning, a hole 22 is first introduced, according to FIG. 4, into the cover plate 21 which on the underside of the inner platform 13 closes off the inner space 18 of the blade airfoil 12 at the point at which the sealing groove 19 is located. The hole aligns with the sealing groove 19 and enables free access to the sealing groove 19 from the outside.

By an electrical discharge machining process (EDM) the damaged sealing groove 19 is then removed from the wall of the blade airfoil 12 over the entire length of the blade airfoil 12 and at the location of the sealing groove a slot 23 is introduced into the wall, the dovetail-shaped cross section of which can be clearly seen in FIG. 5. The dovetail-shaped cross section, as a result of the form-fit which is associated therewith, enables an optimum geometric and mechanical anchoring of the insertion strip (FIGS. 6, 7), which is to be soldered in, during the soldering and retains the strip in an emergency case even if the soldered joint should be defective during operation.

Figure 8:
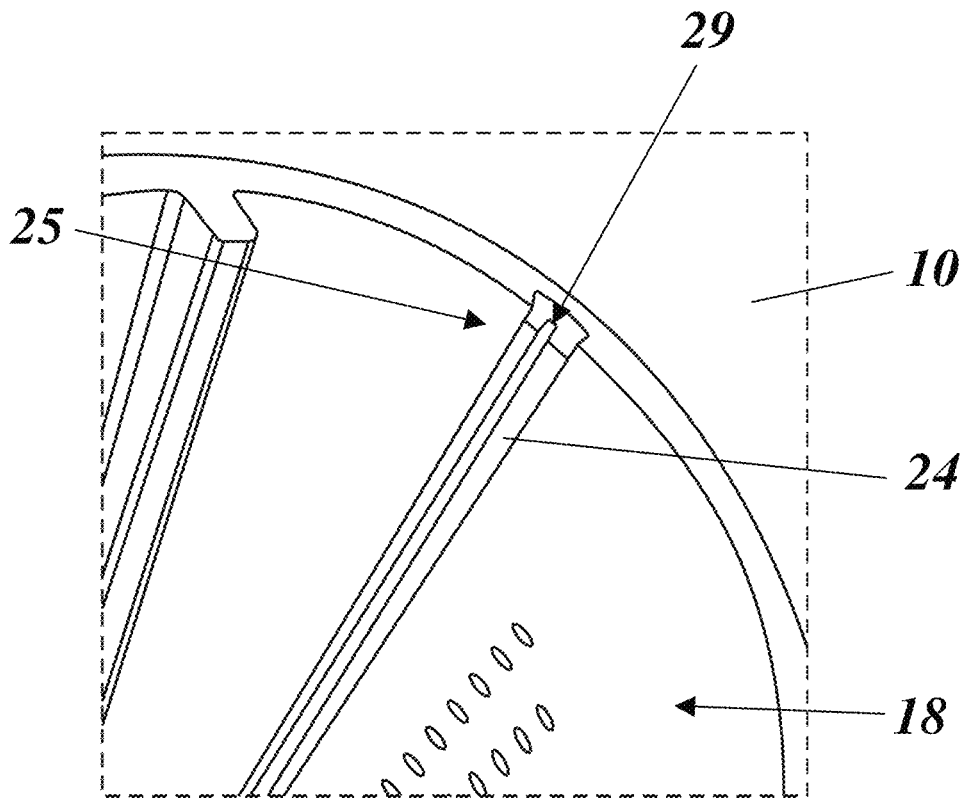
FIG. 8 is a graphic representation of the insertion strip which is fully inserted and embedded in solder material.
Figure 9:
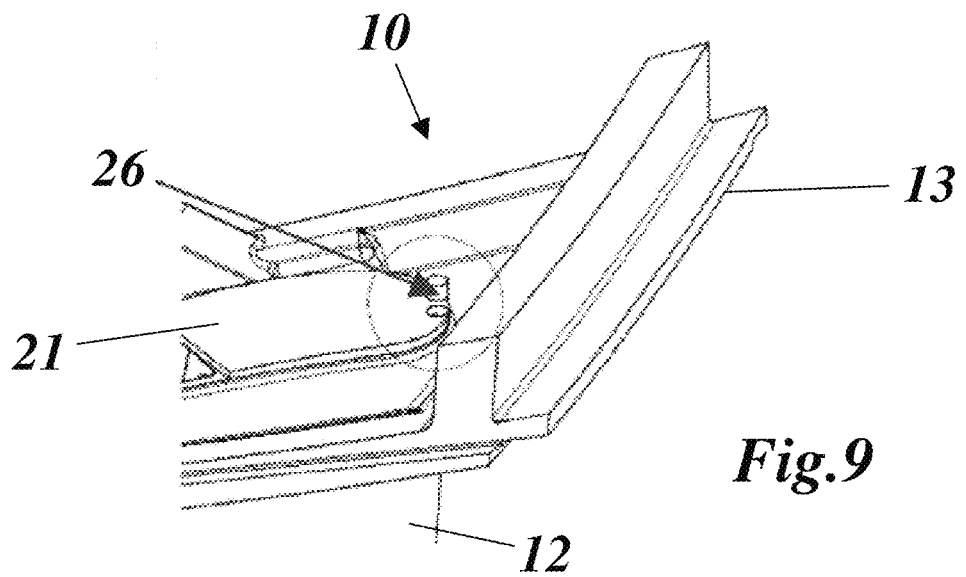
FIG. 9 shows in a view which is comparable to FIG. 4a the closing off of the hole with a plug.

An insertion strip 24, with an adapted cross section, is now inserted from the open side (FIGS. 6, 7) into the slot 23 which is machined out according to FIG. 5 and embedded into a suitable solder material 25 or solder (FIG. 8). The insertion strip 24 in this case can have the new sealing groove 29 from the outset. The sealing groove 29, however, can also be introduced into the insertion strip later on by EDM after the soldering-in of this insertion strip 24. If the insertion strip 24 is inserted and provided with the solder material 25, the actual soldering process can be carried out. If a CoNiCrWC powder of type MM509 is used as solder material or hard solder, the soldering process includes a temperature treatment at about 1220° C. After, or at the same time as, the soldering-in of the insertion strip 24, the hole 22 can be closed off again by a suitable plug 26 (FIG. 9).

Figure 10:
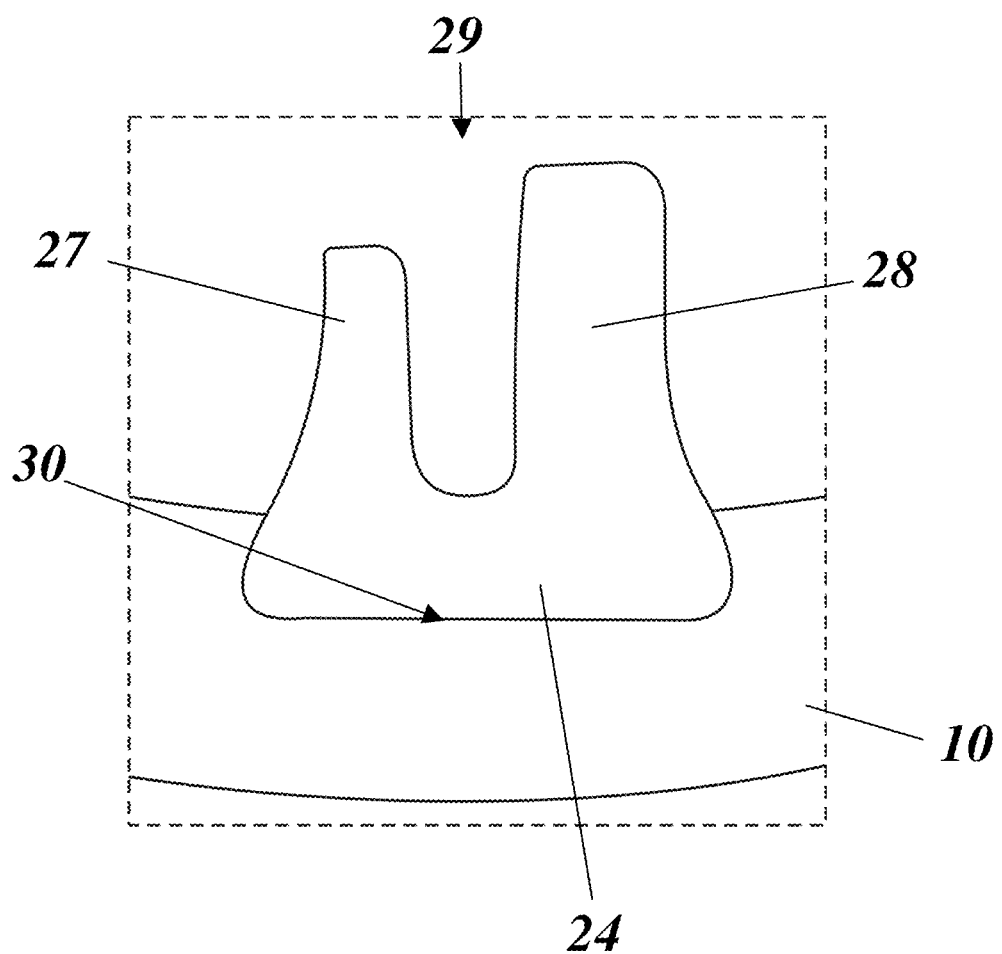
FIG. 10 is a magnified view of the soldered-in insertion strip.

The method provides a reconditioned stator blade, in which a damaged sealing groove inside the blade airfoil is replaced by a hard soldered-in insertion strip with a new sealing groove. The result can be seen in the magnified view of FIG. 10 which shows the soldered-in insertion strip 24 with the soldered joint 30 and the new sealing groove 29 which is delimited by the two sidewalls 27 and 28.

LIST OF DESIGNATIONS

10 Stator blade
11 Outer platform
12 Blade airfoil
13 Inner platform
14, 15, 16 Insert
17 Hot gas passage
18 Inner space (blade airfoil)
19 Sealing groove (U-shaped)
20 Rib
21 Cover plate
22 Hole
23 Slot (dovetail-shaped)
24 Insertion strip
25 Solder material
26 Plug
27, 28 Sidewall
29 Sealing groove
30 Soldered joint

What is claimed is:

1. A method for reconditioning a turbine blade, the turbine blade including a blade airfoil which extends in the longitudinal direction of the blade and which has a hollow inner space into which inserts can be inserted in the longitudinal direction of the blade for the distribution and guiding of cooling air which flows in the inner space, wherein the inserts with a rib engage with sealing effect in a U-shaped sealing groove which is machined out on the inner wall of the blade airfoil and extends in the longitudinal direction of the blade, and wherein a cover plate closes off the hollow inner space of the blade airfoil, the method comprising:
   removing the sealing groove from the inner wall of the blade airfoil, forming a slot;
   inserting an insertion strip, which is provided for sealing, into the slot;
   connecting the insertion strip, which is seated in the slot, in a materially bonding manner to the inner wall of the blade airfoil; and
   introducing a hole, which aligns with the sealing groove, in the cover plate.

2. The method as claimed in claim 1, wherein removal of the sealing groove and introduction of the slot are carried out by an electrical discharge machining process.

3. The method as claimed in claim 1, wherein the slot has a dovetail-shaped cross section and the insertion strip has a cross section which is adapted thereto.

4. The method as claimed in claim 3, wherein the insertion strip is already provided with a sealing groove, which extends in the longitudinal direction, before insertion into the slot.

5. The method as claimed in claim 3, wherein the insertion strip is provided with a sealing groove, which extends in the longitudinal direction, after insertion into the slot and after the materially bonding connection to the inner wall of the blade airfoil.

6. The method as claimed in claim 5, wherein the sealing groove is produced by an electrical discharge machining process.

7. The method as claimed in claim 1, wherein the insertion strip, which is seated in the slot, is connected in a materially bonding manner to the inner wall of the blade airfoil by hard soldering.

8. The method as claimed in claim 7, wherein for hard soldering a CoNiCrWC powder of type MM509 is used and the process includes a temperature treatment at about 1220° C.

9. The method as claimed in claim 7, comprising:
plugging the hole in the cover plate after the insertion strip is bonded to the inner wall of the blade airfoil.

* * * * *